US012584795B2

(12) United States Patent
    Deneuville

(10) Patent No.:    US 12,584,795 B2
(45) Date of Patent:        Mar. 24, 2026

(54) POLARIMETRIC IMAGE SENSOR

(71) Applicant: Commissariat à l'Énergie Atomique et aux Énergies Alternatives, Paris (FR)

(72) Inventor: François Deneuville, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 176 days.

(21) Appl. No.: 18/537,880

(22) Filed: Dec. 13, 2023

(65) Prior Publication Data

US 2024/0201015 A1      Jun. 20, 2024

(30) Foreign Application Priority Data

Dec. 20, 2022    (FR) ...................................... 2213920

(51) Int. Cl.
    *G01J 4/04*            (2006.01)
(52) U.S. Cl.
    CPC ...................................... *G01J 4/04* (2013.01)
(58) Field of Classification Search
    CPC .... G01J 5/20; G01J 4/04; G01J 1/0411; G01J
        1/0422; G01J 5/59; G01J 5/0802; G01J
        1/02; G01J 1/4228; G01J 5/0801; G01J
        3/0224; G01J 5/02; G01J 3/2803; G01J
        1/0204; G01J 1/04; G01J 1/0429; G01J
        1/0488; G01J 3/0208; G01J 3/2823; G01J
        5/0215; G01J 5/023; G01J 5/024; G01J
        5/0806; G01J 5/0853; G01J 3/0216; G01J
        3/51; G01J 1/0209; G01J 1/42; G01J
        1/44; G01J 2005/204; G01J 3/0256; G01J
        2003/2826; G01J 2005/065; G01J 3/0205;
                    (Continued)

(56)                References Cited

U.S. PATENT DOCUMENTS 11,774,655  B2 *  10/2023  Siddique .............. G02B 5/3025
                                        359/485.01
2014/0253756 A1    9/2014  Yokogawa
                    (Continued)

FOREIGN PATENT DOCUMENTS

CN          214315415 U  *  9/2021
CN          217386086 U  *  9/2022 ......... H10F 39/8053
                    (Continued)

OTHER PUBLICATIONS

Preliminary Search Report for French Application No. 2213920, dated Jun. 22, 2023.
                    (Continued)

*Primary Examiner* — Michael P Stafira
(74) *Attorney, Agent, or Firm* — Wolf, Greenfield & Sacks, P.C.

(57)                ABSTRACT

A polarimetric image sensor formed inside and on top of a semiconductor substrate, the sensor including: —a plurality of pixels, each comprising a photodetector formed in the semiconductor substrate; —a polarizing filter arranged on the side of an illumination surface of the photodetectors, the filter including, for each pixel, a polarizing structure; and—a polarization router comprising a two-dimensional metasurface arranged on the side of the polarizing filter opposite to the photodetectors, the metasurface including a two-dimensional array of pads.

17 Claims, 6 Drawing Sheets

(58) Field of Classification Search
CPC .... G01J 5/06; G01J 1/08; G01J 3/0229; G01J
5/04; G01J 5/0816; G01J 5/0831; G01J
2003/282; G01J 2005/0077; G01J 3/0259;
G01J 3/18; G01J 3/447; G01J 5/0025;
G01J 5/0275; G01J 5/485; G01J 5/58;
G01J 1/0425; G01J 1/0474; G01J
2003/104; G01J 3/0213; G01J 3/0218;
G01J 3/10; G01J 3/4406; G01J 3/506;
G01J 5/0003; G01J 5/10; G01J
2001/4247; G01J 3/02; G01J 3/021; G01J
3/0232; G01J 3/0235; G01J 3/26; G01J
3/42; G01J 3/433; G01J 5/0205
See application file for complete search history.

(56) References Cited

U.S. PATENT DOCUMENTS

| | | | |
|---|---|---|---|
| 2021/0057474 A1 | 2/2021 | Yamazaki | |
| 2021/0191021 A1* | 6/2021 | Siddique | ............ H10F 39/8023 |
| 2021/0226583 A1* | 7/2021 | Yao | ....................... G06T 7/0004 |
| 2022/0093656 A1 | 3/2022 | Deneuville | |
| 2022/0214219 A1* | 7/2022 | Faraon | .................. G01J 3/0229 |
| 2023/0314681 A1* | 10/2023 | Wang | ..................... H10F 39/18 257/432 |

FOREIGN PATENT DOCUMENTS

| | | | | | |
|---|---|---|---|---|---|
| DE | 102019108316 A1 | * | 10/2020 | .......... | G02B 27/285 |
| JP | 2020504826 A | * | 2/2020 | .......... | G01J 3/0224 |
| TW | 753603 B1 | * | 1/2022 | | |
| WO | WO-2019126656 A2 | * | 6/2019 | .......... | G02B 5/3058 |
| WO | WO-2021234924 A1 | * | 11/2021 | .......... | H10F 39/182 |
| WO | WO 2022/172098 A1 | | 8/2022 | | |

OTHER PUBLICATIONS

Kwon et al., Single-shot quantitative phase gradient microscopy using a system of multifunctional metasurfaces. Nature Photonics. Feb. 2020;14(2):109-14.
Zuo et al., Chip-Integrated Full-Stokes Polarimetric Imaging Sensor. CLEO: Science and Innovations. May 15, 2022:SF2K.5.

* cited by examiner

400

401

401

MS

P

P

P

P

400

M        M

P        P        P        P 401        401

MS

117

115

105        101

107        109

103

POLARIMETRIC IMAGE SENSOR

CROSS REFERENCE TO RELATED APPLICATIONS

This application claims priority to French application number 2213920, filed Dec. 20, 2022, the contents of which is incorporated herein by reference in its entirety.

TECHNICAL FIELD

The present disclosure generally concerns image sensors, and more particularly so-called polarimetric image sensors, adapted to recording information relative to the polarization of the captured light.

PRIOR ART

The measurement of the light polarization information during the acquisition of an image may be of interest for many applications. In particular, it enables to implement image enhancement processings, adapted according to the considered application. For example, it enables to attenuate or, on the contrary, to exacerbate, reflections on an image of any surface causing a specular reflection, such as glass, water, or the surface of an eye. It further makes it possible to detect manufactured objects in a natural environment, the latter generally having a polarization signature. Among the applications that can benefit from the measurement of the polarization information, there can be mentioned industrial control applications, biomedical applications, for example applications of detection of cancer cells (the latter polarizing light due to their fibrous nature), contrast enhancement applications for the capture of images in a diffuse environment (fog, underwater imaging, etc.), or also distance mapping or depth image acquisition applications, where the polarization may provide information relative to the surface orientation of manufactured objects, and thus help 3D reconstruction as a complement to another modality such as the active illumination with structured light or by time-of-flight measurement.

To measure polarization information, it has already been proposed to successively acquire, by means of a same sensor, a plurality of images of a same scene, by placing for each acquisition a polarizer in front of the sensor, and by changing polarizer between two successive acquisitions. This results in relatively bulky acquisition systems, with the presence in front of the sensor of a mechanism, for example a motor-driven rotating wheel or plate having the various polarizers attached thereto, enabling to change the polarizer between two acquisitions. Another limitation is the need to successively acquire a plurality of images of the scene to record a plurality of polarization states. This may particularly raise an issue when the scene varies over time.

To overcome these limitations, it has been provided to place an array of polarizing filters in front of the image sensor. There however remains the limitation that the polarizing filters block part of the light signal received by the acquisition system. Thus, the general sensitivity or quantum efficiency of the acquisition system is relatively low.

It would be desirable to at least partly overcome certain limitations of known polarimetric image acquisition solutions.

SUMMARY OF THE INVENTION

For this purpose, an embodiment provides a polarimetric image sensor formed inside and on top of a semiconductor substrate, the sensor comprising:

a plurality of pixels, each comprising a photodetector formed in the semiconductor substrate;

a polarizing filter arranged on the side of an illumination surface of the photodetectors, the filter comprising, for each pixel, a polarizing structure; and a polarization router comprising a two-dimensional metasurface arranged on the side of the polarizing filter opposite to the photodetectors, the metasurface comprising a two-dimensional array of pads.

According to an embodiment, said plurality of pixels comprises at least first and second pixels adapted to measuring radiations according to respectively first and second distinct polarizations, the polarizing structure of the first pixel being adapted to predominantly transmitting a radiation according to the first polarization and the polarizing structure of the second pixel being adapted to predominantly transmitting a radiation according to the second polarization.

According to an embodiment, a first portion of the two-dimensional metasurface located vertically in line with the first and second pixels is adapted to predominantly transmitting:

a radiation according to the first polarization towards the polarizing structure of the first pixel; and a radiation according to the second polarization towards the polarizing structure of the second pixel.

According to an embodiment, the first and second polarizations are linear polarizations along first and second directions respectively forming 0° and 90° angles with a reference direction.

According to an embodiment, said plurality of pixels further comprises third and fourth pixels adapted to measuring a radiation according to respectively third and fourth distinct polarizations, different from the first and second polarizations, the polarizing structure of the third pixel being adapted to predominantly transmitting a radiation according to the third polarization and the polarizing structure of the fourth pixel being adapted to predominantly transmitting a radiation according to the fourth polarization.

According to an embodiment, a second portion of the two-dimensional metasurface, different from the first portion and located vertically in line with the third and fourth pixels, is adapted to predominantly transmitting:

a radiation according to the third polarization towards the polarizing structure of the third pixel; and a radiation according to the fourth polarization towards the polarizing structure of the fourth pixel.

According to an embodiment, the third and fourth polarizations are linear polarizations along third and fourth directions respectively forming 45° and 135° angles with the reference direction.

According to an embodiment, each polarizing structure comprises a plurality of parallel metal bars.

According to an embodiment, each metal bar is coated with an absorbing stack.

According to an embodiment, the absorbing stack comprises:

a tungsten layer;

a silicon layer, coating the tungsten layer; and a dielectric layer, coating the silicon layer.

According to an embodiment, the pads of the two-dimensional metasurface are made of amorphous silicon.

According to an embodiment, the pads of the two-dimensional metasurface are laterally surrounded with silicon oxide.

According to an embodiment, the pads of the two-dimensional metasurface have sub-wavelength lateral dimensions.

According to an embodiment, the sensor further comprises a plurality of first microlenses extending in front of a pair of adjacent pixels of the sensor.

According to an embodiment, the first microlenses each have an elongated shape.

According to an embodiment, the first microlenses are:

A) arranged on the side of a surface of the two-dimensional metasurface opposite to the photodetectors; or B) interposed between the photodetectors and the two-dimensional metasurface.

According to an embodiment, the sensor further comprises a plurality of second microlenses distinct from the first microlenses and arranged on the side of a surface of the two-dimensional metasurface opposite to the photodetectors, each second microlens extending in front of a pair of adjacent pixels of the sensor.

According to an embodiment, each second microlens has an elongated shape.

According to an embodiment, each first microlens further extends in front of the first portion or the second portion of the metasurface.

Further, an embodiment provides a polarimetric image sensor formed inside and on top of a semiconductor substrate, the sensor comprising:

a plurality of pixels each comprising a photodetector formed in the semiconductor substrate;

a polarization router comprising a two-dimensional metasurface arranged on the side of an illumination surface of the photodetectors, the metasurface comprising a two-dimensional array of pads; and a plurality of first microlenses extending in front of a pair of adjacent pixels of the sensor.

According to an embodiment, the first microlenses are arranged on the side of the polarization router opposite to the photodetectors.

According to an embodiment, the first microlenses are interposed between the photodetectors and the two-dimensional metasurface.

According to an embodiment, said plurality of pixels comprises, in front of one of the first microlenses, first and second pixels adapted to measuring radiations according to first and second distinct polarizations respectively, a first portion of the two-dimensional metasurface located vertically in line with the first and second pixels being adapted to predominantly transmitting:

a radiation according to the first polarization towards the first pixel; and a radiation according to the second polarization towards the second pixel.

According to an embodiment, the rows of pads of the first portion of the two-dimensional metasurface are identical to one another.

According to an embodiment, the first portion of the two-dimensional metasurface is adapted to focusing the incident radiation predominantly along a direction parallel to the rows of pads.

According to an embodiment, said plurality of pixels further comprises third and fourth pixels adapted to measuring radiations according to respectively third and fourth distinct polarizations, different from the first and second polarizations, a second portion of the two-dimensional metasurface located vertically in line with the third and fourth pixels being adapted to predominantly transmitting:

a radiation according to the third polarization towards the third pixel; and a radiation according to the fourth polarization towards the fourth pixel.

According to an embodiment, the sensor further comprises a polarizing filter interposed between said plurality of pixels and the two-dimensional metasurface, the filter comprising, for each pixel, a polarizing structure.

According to an embodiment, the polarizing structure of the first pixel is adapted to predominantly transmitting a radiation according to the first polarization and the polarizing structure of the second pixel is adapted to predominantly transmitting a radiation according to the second polarization.

Further, an embodiment provides a polarizing filter intended to be arranged in front of an image sensor comprising a plurality of pixels, the filter comprising, for each pixel, a polarizing structure comprising a plurality of parallel metal bars, each bar being coated with an absorbing stack comprising:

a tungsten layer;

a silicon layer, coating the tungsten layer; and a dielectric layer, coating the silicon layer.

According to an embodiment, the metal bars are made of a material different from tungsten, preferably of aluminum.

According to an embodiment, the tungsten layer has a thickness greater than 40 nm, preferably greater than 60 nm.

According to an embodiment, the metal bars are made of tungsten.

According to an embodiment, the metal bars and the tungsten layer have a cumulated thickness greater than 40 nm, preferably greater than 60 nm.

According to an embodiment, the silicon layer has a thickness in the range from 20 to 100 nm, preferably from 30 to 50 nm, for example equal to approximately 39 nm.

According to an embodiment, the dielectric layer is made of silicon oxide.

According to an embodiment, the dielectric layer is formed of a stack of a plurality of layers made of dielectric materials having refraction indices lower than that of silicon.

Further, an embodiment provides a polarimetric image sensor formed inside and on top of a semiconductor substrate, the sensor comprising:

a plurality of pixels, each comprising a photodetector formed in the semiconductor substrate; and a polarizing filter such as described, the filter being arranged on the side of an illumination surface of the photodetectors.

According to an embodiment, the first, second, third, and fourth polarizations are linear polarizations along first, second, third, and fourth directions respectively forming 0°, 90°, 45°, and 135° angles with respect to a reference direction.

According to an embodiment, the sensor further comprises a polarization router comprising a two-dimensional metasurface arranged on the side of the polarizing filter opposite to the photodetectors, the metasurface comprising a two-dimensional array of pads.

According to an embodiment, the two-dimensional metasurface comprises:

a first portion located vertically in line with the first and second pixels, adapted to predominantly transmitting:

a radiation according to the first polarization towards the first pixel; and a radiation according to the second polarization towards the second pixel, and a second portion located vertically in line with the third and fourth pixels, adapted to predominantly transmitting:

a radiation according to the third polarization towards the third pixel; and a radiation according to the fourth polarization towards the fourth pixel.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the photodetection elements and the electronic circuits for controlling the described image sensors have not been detailed, the described embodiments being compatible with usual implementations of these elements. Further, the possible applications of the described image sensors have not been detailed, the described embodiments being compatible with all or most known applications of polarimetric image acquisition systems.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1A:
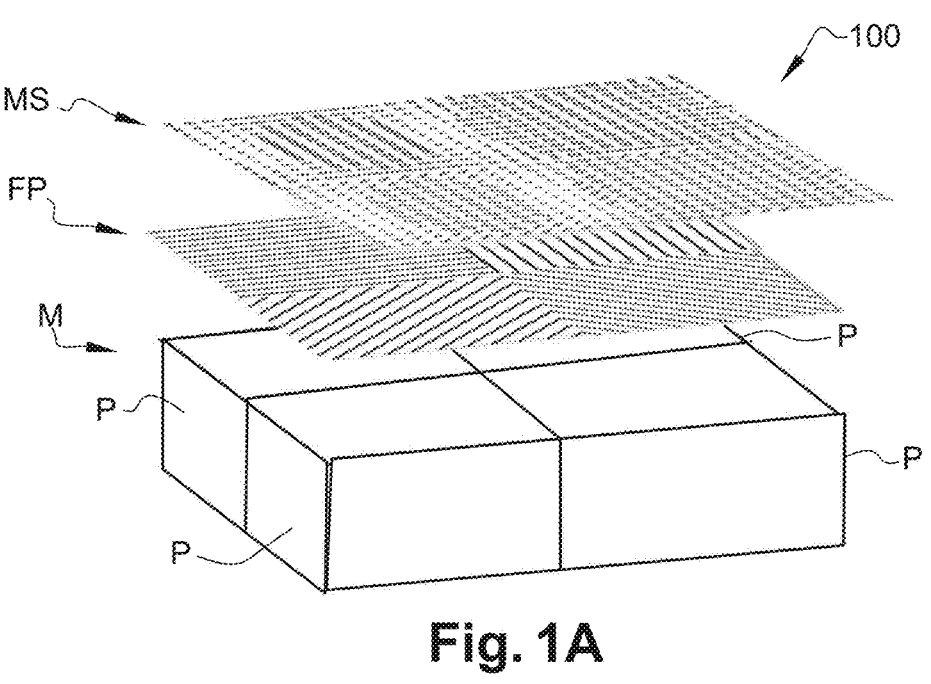
FIG. 1A and FIG. 1B respectively are an exploded perspective view and a cross-section view of an example of a polarimetric image sensor according to an embodiment.
Figure 1B:
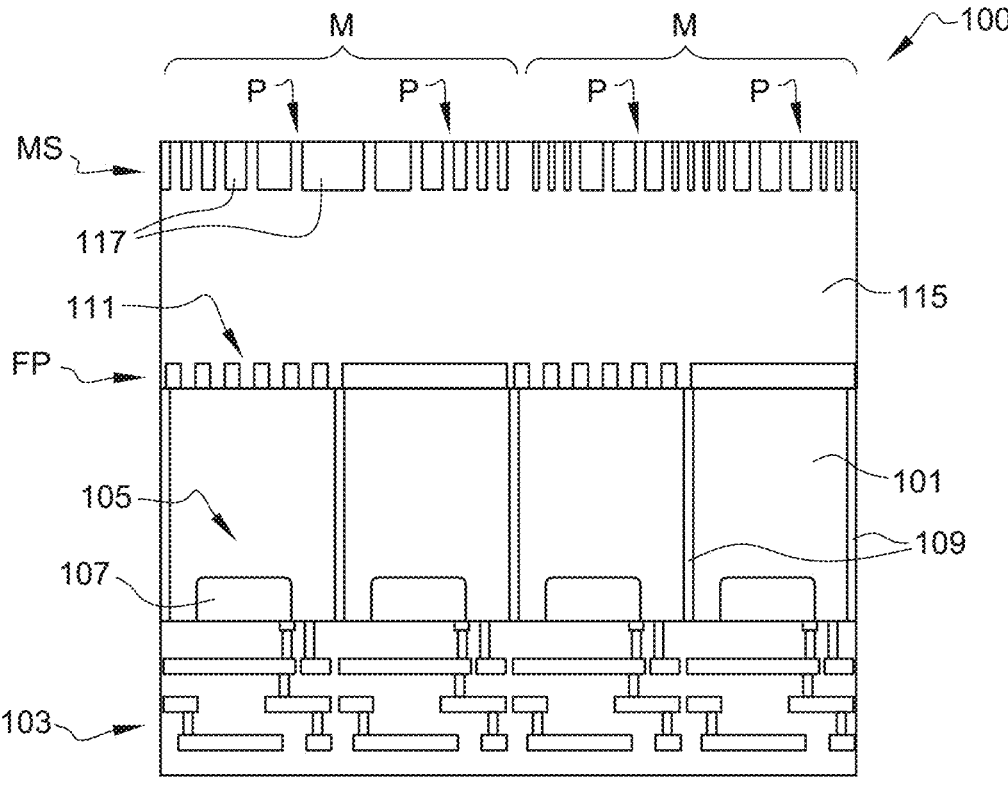

FIG. 1A and FIG. 1B respectively are an exploded perspective view and a cross-section view of an example of a polarimetric image sensor 100 according to one embodiment.

Sensor 100 is formed inside and on top of a substrate 101. Substrate 101 is for example made of a single-crystal semiconductor material, for example single-crystal silicon.

Sensor 100 comprises a plurality of pixels P formed inside and on top of semiconductor substrate 101. In top view, pixels P are for example arranged in an array of rows and columns.

Sensor 100 also comprises, on the side of a first surface of substrate 101, called front side, corresponding to the lower surface of the substrate 101 in the orientation of FIGS. 1A and 1B, a stack 103 of insulating and conductive layers (for example metallic), called interconnection stack, having interconnection elements (for example, conductive interconnection tracks and vias) of the sensor pixels P formed therein.

In the example of FIGS. 1A and 1B, sensor 100 is a back-side illuminated sensor, also called BSI sensor, that is, light rays originating from the scene to be imaged illuminate substrate 101 on its back side, that is, its side opposite interconnection stack 103, that is, its upper surface in the orientation of FIGS. 1A and 1B.

Each pixel P of sensor 100 comprises a photosensitive region 105 formed in substrate 101. Each photosensitive region 105 for example comprises a photodetection element 107, for example a photodiode or photodetector. In the shown example, the photosensitive regions 105 of pixels P are laterally separated from one another by insulating walls 109. Insulating walls 109 are for example made of a dielectric material, for example, silicon oxide. As a variant (not detailed in the drawings), insulating walls 109 comprise external side walls made of a dielectric material, for example silicon oxide, and a central wall made of an electrically-conductive material, for example doped polysilicon or a metal. In this example, insulating walls 109 vertically extend across the entire thickness of substrate 101. The thickness of substrate 101 is for example in the range from 1 to 20 μm, for example from 3 to 10 μm. As a variant, insulating walls 109 may be omitted.

Each pixel P is topped with a polarizing structure 111 arranged in front of the photosensitive region 105 of the pixel, on the side of the illumination surface of photodetector 107, that is, on the upper surface side of substrate 101 in the orientation of FIGS. 1A and 1B. The assembly of the polarizing structures 111 located vertically in line with the pixels P of sensor 100 forms, for example, a polarization filter or polarizing filter FP.

Each polarizing structure 111 is adapted to predominantly transmitting light rays according to a predefined polarization.

In the example of FIGS. 1A and 1B, the sensor comprises a plurality of pixels P having their respective polarizing structures 111 having different polarization orientations and thus being adapted to predominantly transmitting light radiation according to different polarizations. This makes it possible to measure, by means of distinct P pixels, intensities of light radiation received according to different polarizations. In other words, the sensor comprises at least first and second pixels P intended to measure intensities of light radiation received according to first and second polarizations respectively, for example first and second orthogonal linear polarizations. As an example, the polarizing structure 111 of the first pixel has a radiation transmission coefficient according to the first polarization greater than its radiation transmission coefficient according to the second polarization, and the polarizing structure 111 of the second pixel has a radiation transmission coefficient according to the second polarization greater than its radiation transmission coefficient according to the first polarization.

The polarizing structures are, for example, metal structures comprising openings and predominantly transmitting a radiation according to a predefined polarization, and absorbing or reflecting radiations according to other polarizations. The metal structures are for example made of aluminum or of copper. As a variant, other metals may be used, for example silver, gold, tungsten, or titanium.

As an example, a filling material 115, for example, a dielectric material such as silicon oxide, silicon nitride, alumina ($Al_2O_3$), tantalum oxide, or hafnium oxide, fills the openings formed in the metal structures. In this example, material 115 also covers polarizing structures 111, forming a planarization layer 115. As a variant, the openings of polarizing structures 111 may be left empty or filled with air.

In practice, the selection of the patterns and the sizing of polarizing structures 111 may be performed by means of known electromagnetic simulation tools.

As an example, pixels P are distributed into macropixels M, each comprising at least two adjacent pixels P, for example four adjacent pixels P. In each macropixel M, the pixels P of the macropixel have different polarizing structures 111. Thus, in each macropixel M, the pixels P of the macropixel measure intensities of light radiations received according to different polarizations.

Sensor 100 also comprises a two-dimensional (2D) metasurface MS located in front of pixels P. Metasurface MS is more precisely arranged on the side of polarizing filter FP opposite to photodetectors 107. Metasurface MS comprises a two-dimensional array of pads 117 of a first material, for example amorphous silicon, laterally surrounded with a second material, for example material 115, for example silicon oxide. More generally, the first material has a higher refraction index than the second material. The pads 117 of metasurface MS have sub-wavelength lateral dimensions, that is, the largest lateral dimension of each pad 117 is smaller than the main wavelength intended to be measured by the underlying pixel P, that is, the wavelength for which the quantum efficiency of pixel P is maximum. For example, for pixels P intended to measure visible or near-infrared radiation, for example a radiation with a wavelength lower than 1 μm, the largest dimension of each pad 117 is in the range from 10 to 500 nm, for example from 30 to 300 nm.

Metasurface MS corresponds, for example, to a polarization router or sorter adapted to implementing a function of optical polarization routing or sorting towards the various underlying polarizing structures 111 of polarizing filter FP. In practice, metasurface MS comprises, in front of each pixel P, a plurality of pads 117 having various lateral dimensions. The size and the arrangement of pads 117 are defined according to the optical function which is desired to be achieved. For example, to achieve the function of polarization routing or polarized light routing, pads 117 having, in top view, asymmetrical shapes, for example rectangular or elliptical, may be provided, it being understood that pads 117 may have, in top view, any shape. Pads 117 may have vertical sides, that is, orthogonal to the upper surface of substrate 101, oblique sides or stepped sides, comprising at least one step. Further, each pad 117 may be made of a single material or of a stack of layers of different materials. The pattern of metasurface MS may be defined by means of an electromagnetic simulation tool, for example using inverse design methods, for example of the type described in the article entitled "Phase-to-pattern inverse design paradigm for fast realization of functional metasurfaces via transfer learning" by Zhu, R., Qiu, T., Wang, J. et al. Nat. Commun. 12, 2974 (2021), or in the article entitled "Matrix Fourier optics enables a compact full-Stokes polarization camera" by Rubin et al. (SCIENCE—Volume 365—Issue 6448—Jul. 5, 2019).

The pads 117 of metasurface MS preferably all have the same height, for example of the same order of magnitude as the main wavelength intended to be measured by each pixel P, for example in the range from 20 nm to 2 μm, preferably from 50 nm to 750 nm, for radiations having wavelengths lower than 1 μm. The fact of providing pads 117 of constant height over the entire surface of the sensor advantageously enables to simplify the manufacturing of metasurface MS.

In the example shown in FIGS. 1A and 1B, the polarization sorter of sensor 100 comprises a single metasurface MS. As a variant, the polarization sorter of sensor 100 could comprise a plurality of metasurfaces, for example similar to metasurface MS.

Figure 2:
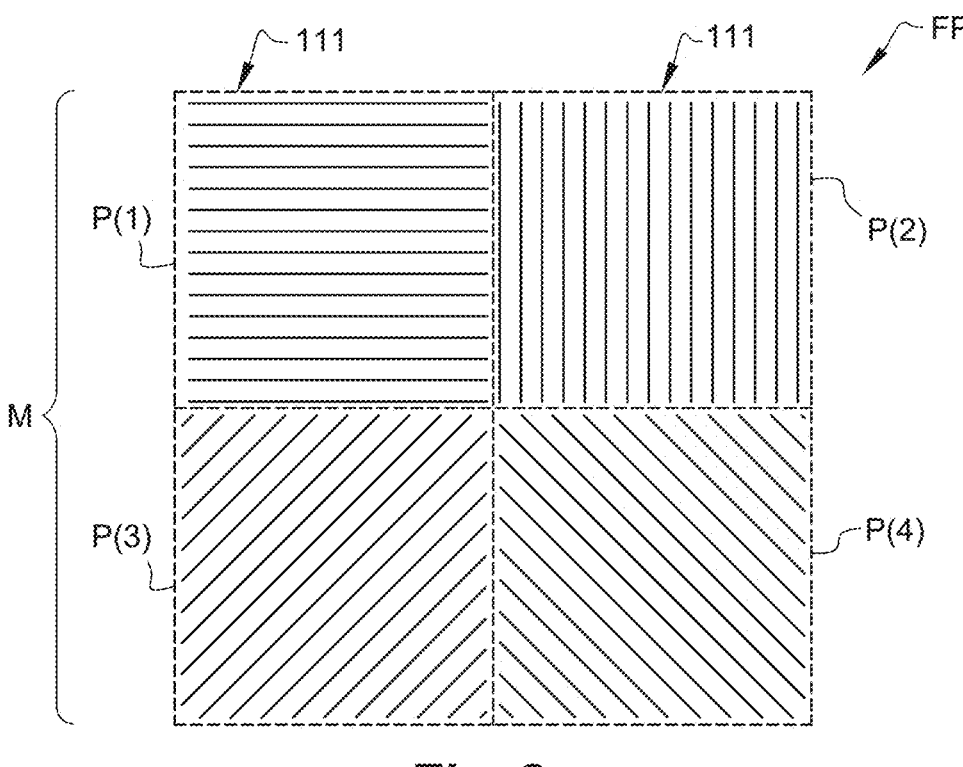
FIG. 2 is a simplified and partial top view of an example of embodiment of the polarizing filter of the sensor of FIGS. 1A and 1B.

FIG. 2 is a simplified and partial top view of an example of the polarizing filter FP of the sensor 100 shown in FIGS. 1A and 1B.

FIG. 2 more particularly illustrates the polarizing structures 111 of the pixels P of a same macropixel M. In this example, each macropixel M comprises four adjacent pixels P(1), P(2), P(3), and P(4) adapted to measuring intensities of a light radiation received according to respectively four different polarization orientations PS1, PS2, PS3 and PS4, for example, linear polarizations along respectively four directions respectively forming angles of 0°, 90°, 45° and 135° with a reference direction. In this example, the four pixels P(1), P(2), P(3), and P(4), symbolized by squares in dotted lines in FIG. 2, are arranged in an array of two rows and two columns.

Polarizing structures 111 are, for example, metal grids, each comprising a plurality of regularly spaced apart parallel metal bars, predominantly transmitting a radiation according to a linear polarization perpendicular to the metal bars, and absorbing radiations according to the other polarizations.

As a variant, the number of pixels P per macropixel M may be different from four. Further, the described embodiments are not limited to linear polarizing structures 111. As a variant, each macropixel M may comprise one or a plurality of linear polarizing structures 111 and/or one or a plurality of circular polarizing structures 111.

As an example, the polarizing structures 111 of pixels P of same position in the different macropixels M of the sensor are adapted to predominantly transmitting the same polarization orientation.

As an example, the polarizing structures 111 of same polarization orientation in the various macropixels M of the sensor are all identical, to within manufacturing dispersions.

As a variant, the polarizing structures 111 of same polarization orientation in the different macropixels M of the sensor have patterns adapted according to the position of macropixel M on the sensor, to take into account the main direction of incidence of the light radiation received by the macropixel.

Although this has not been illustrated in FIGS. 1A and 1B, each pixel P of sensor 100 may comprise a color filter arranged above the polarizing structure and adapted to predominantly transmitting light in a given wavelength range. The color filters are arranged above the planarization layer 115, for example, in contact, by their lower surface, with the upper surface of layer 115. Different pixels P may comprise different color filters. As an example, the sensor comprises pixels P comprising a color filter adapted to predominantly transmitting red light, pixels P comprising a color filter adapted to predominantly transmitting green light, and P pixels comprising a color filter adapted to predominantly transmitting blue light. As an example, the pixels P of a same macropixel M comprise identical color filters, and the pixels P of neighboring macropixels M comprise different color filters. The color filters are for example made of colored resin.

As an example, the polarizing structures 111 of same polarization orientation in the different macropixels M of the sensor have patterns adapted according to the pixel color, that is, to the wavelength range predominantly transmitted by the color filter of the pixel.

As a non-limiting example, for linear polarizers of the type illustrated in FIG. 2, made of aluminum with a silicon oxide filling, and intended to operate at visible and/or infrared wavelengths, the sizing of the metal bars may be as follows:

for blue light having a wavelength in the order of 450 nm (and/or for light having a greater wavelength, for example, infrared light), the metal bars may have a height in the range from 50 to 100 nm, a width in the order of 60 nm, and a repetition period in the order of 180 nm;

for green light having a wavelength in the order of 530 nm (and/or for light having a greater wavelength, such as infrared light), the metal bars may have a height in the range from 50 to 100 nm, a width in the order of 70 nm, and a repetition period in the order of 210 nm;

for red light having a wavelength in the order of 610 nm (and/or for light having a greater wavelength, such as infrared light), the metal bars may have a height in the range from 50 to 100 nm, a width in the order of 80 nm, and a repetition period in the order of 240 nm; and for infrared light having a wavelength in the order of 940 nm or more, the metal bars may have a height in the range from 50 to 100 nm, a width in the order of 90 nm, and a repetition period in the order of 280 nm.

In practice, to simplify manufacturing processes, it is preferable for the height of the metal bars of polarizing structures 111 to be the same in all the sensor pixels P. Thereby, compromises can be made between the complexity of polarizers 111 and their polarization filtering performance.

Figure 3:
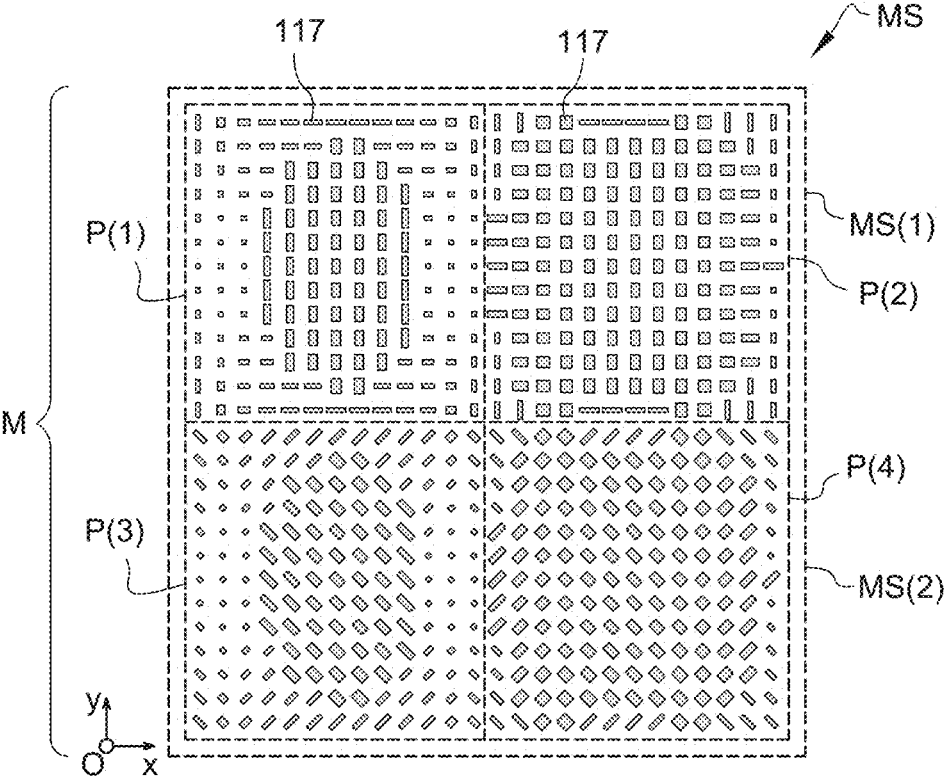
FIG. 3 is a simplified and partial top view of an example of embodiment of the polarization router of the sensor of FIGS. 1A and 1B.

FIG. 3 is a simplified and partial top view of an example of embodiment of the polarization router of the sensor of FIGS. 1A and 1B.

FIG. 3 more particularly illustrates an example of shape and of arrangement of the pads 117 of metasurface MS vertically in line with a macropixel M. In this example, macropixel M comprises, as previously explained in relation with FIG. 2, the four neighboring pixels P(1), P(2), P(3), and P(4) adapted to measuring intensities of light radiation received according to the four different polarization orientations PS1, PS2, PS3, and PS4 respectively.

In the shown example, metasurface MS comprises a first portion MS(1), located vertically in line with pixels P(1) and P(2), and a second portion MS(2), located vertically in line with pixels P(3) and P(4). In this example, the first portion MS(1) of metasurface MS has a pattern adapted to implementing a function of routing of the light rays received according to the two polarization states PS1 and PS2 towards respectively the polarizing structures 111 of the two pixels P(1) and P(2) of macropixel M. Similarly, the second portion MS(2) of metasurface MS has a pattern adapted to implementing a function of routing of the light rays received according to the two polarization states PS3 and PS4 towards respectively the polarizing structures 111 of the two pixels P(3) and P(4) of macropixel M. The components of the incident flux polarized according to states PS1, PS2, PS3, and PS4 are thus deflected towards respectively the pixels P(1), P(2), P(3), and P(4) of macropixel M. A photon arriving above pixel P(1) or pixel P(2) will then be sorted into PS1 or PS2, and a photon arriving above pixel P(3) or of pixel P(4) will be sorted into PS3 or PS4.

As compared with a polarimetric sensor based on polarizing filters, this advantageously enables to improve the quantum efficiency of the sensor, since the entire flux collected in front of each macropixel M is transmitted to the four pixels P(1), P(2), P(3), and P(4) of the macropixel.

In the shown example, each portion MS(1), MS(2) of metasurface MS is adapted to focusing the incident light along two orthogonal axes Ox and Oy, the Ox and Oy axes respectively corresponding to the horizontal axis and to the vertical axis, in the orientation of FIG. 3.

Pads 117 for example have a constant pitch, that is, a constant center-to-center distance, over the entire metasurface MS. As an example, the pitch of the array of pads 117 of metasurface MS is in the range from 250 to 300 nm. In the shown example, the portions MS(1) and MS(2) of metasurface MS each have a substantially rectangular-shaped periphery. This corresponds, for example, to a case where the pixels P of the sensor each have, in top view, a substantially square-shaped periphery, the rectangle formed by each portion MS(1), MS(2) of metasurface MS then having, for example, lateral dimensions substantially equal to those of a rectangle formed by a pair of adjacent pixels P. As an example, each portion MS(1), MS(2) of metasurface MS has a length in the range from 4 to 8 μm and a width equal to approximately half the length, for example in the range from 2 to 4 μm. This example is however not limiting, and the portions MS(1) and MS(2) of metasurface MS may, for example, have lateral dimensions smaller than those mentioned above, for example smaller than 1 μm in a case where pixels P have a pitch in the order of 0.5 μm or 1 μm.

As a variant, each portion MS(1), MS(2) of metasurface MS may have a periphery having any shape, for example square. This for example corresponds to a case where the sensor pixels P each have, in top view, a substantially rectangular-shaped periphery, the square formed by each portion MS(1), MS(2) of the metasurface then for example having lateral dimensions substantially equal to those of a square formed by a pair of pixels P adjacent by their long side. An advantage of providing for each portion MS(1), MS(2) of metasurface MS to have a square shape is that this enables to facilitate a spatial sampling of the image acquired by the pixels P of sensor 100.

The pattern of the portion of metasurface MS located vertically in line with macropixel M may be repeated identically (to within manufacturing dispersions) in front of all the other macropixels M of the sensor.

As a variant, the pattern of the portion of metasurface MS may vary from one macropixel M to another, according to the position of the macropixel on the sensor, in particular to take into account the main direction of incidence of the rays arriving on metasurface MS from the scene to be imaged.

Figures 4A, 4B:
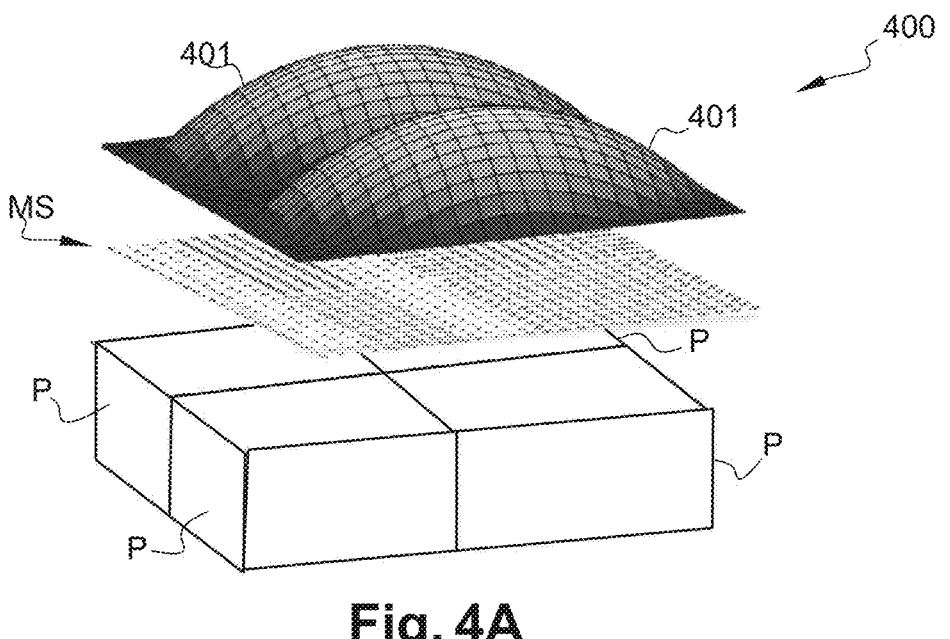
FIG. 4A and FIG. 4B respectively are an exploded perspective view and a cross-section view of another example of a polarimetric image sensor according to an embodiment.

FIG. 4A and FIG. 4B are respectively an exploded perspective view and a cross-section view of another example of a polarimetric image sensor 400 according to an embodiment.

The polarimetric image sensor 400 of FIGS. 4A and 4B has elements in common with the polarimetric image sensor 100 of FIGS. 1A and 1B. These common elements will not be detailed again hereafter.

The sensor 400 of FIGS. 4A and 4B differs from the sensor 100 of FIGS. 1A and 1B in that sensor 400 lacks polarizing filter FP and comprises, on the side of the polarization router opposite to photodetectors 107, a plurality of microlenses 401. In the shown example, each microlens 401 has an elongated shape and extends in front of a pair of adjacent pixels P of sensor 400. Each microlens 401 has, for example, in top view, a cross-section of oval or rectangular shape with rounded corners. This corresponds, for example, to a case where the sensor pixels P each have, in top view, a substantially square-shaped periphery, each microlens 401 then for example having lateral dimensions equal to those of a rectangle formed by a pair of adjacent pixels P. In the shown example, microlenses 401 are refractive microlenses.

As a variant, each microlens 401 may have any shape, for example a periphery of circular or square shape with rounded corners, in top view. This corresponds, for example, to a case where the sensor pixels P each have, in top view, a substantially rectangular periphery, the circle or the square formed by the periphery of each microlens 401 then having, for example, respectively a diameter or a side length substantially equal to the side length of a square formed by a pair of pixels P adjacent by their long side.

As an example, each microlens 401 is made of flowed resin.

Figure 5:
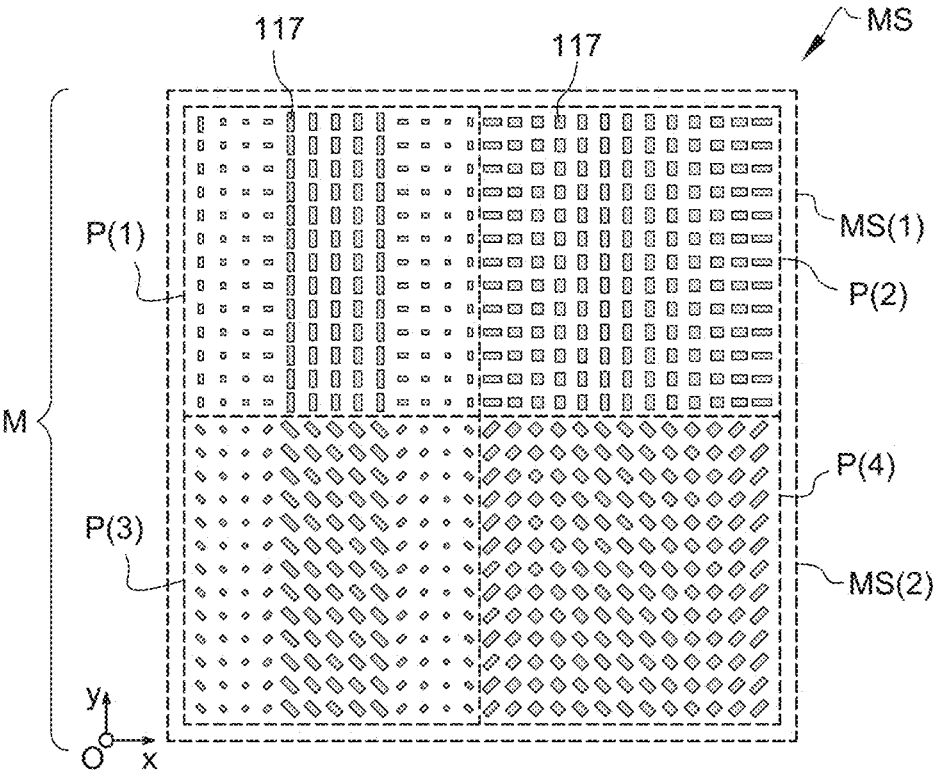
FIG. 5 is a simplified and partial top view of an example of embodiment of the polarization router of the sensor of FIGS. 4A and 4B.

FIG. 5 is a simplified and partial top view of an example of the polarization router of the sensor 400 of FIGS. 4A and 4B.

FIG. 5 more particularly illustrates an example of shape and of arrangement of the pads 117 of the metasurface MS of sensor 400 vertically in line with a macropixel M. In this example, macropixel M comprises, as previously discussed in relation with FIG. 2, the four adjacent pixels P(1), P(2), P(3), and P(4) adapted to measuring intensities of light radiation received according to respectively the four different polarization orientations PS1, PS2, PS3, and PS4.

In the shown example, metasurface MS comprises, as previously discussed in relation with FIG. 3, first portion MS(1) located vertically in line with pixels P(1) and P(2), and second portion MS(2) located vertically in line with pixels P(3) and P(4). In this example, the first portion MS(1) of metasurface MS has a pattern adapted to implementing a function of routing of the received light rays according to the two polarization states PS1 and PS2 towards respectively the two pixels P(1) and P(2) of macropixel M. Similarly, the second portion MS(2) of metasurface MS has a pattern adapted to implementing a function of routing of the received light rays according to the two polarization states PS3 and PS4 towards the two pixels P(3) and P(4) respectively of macropixel M. The components of the incident flux polarized according to states PS1, PS2, PS3, and PS4 are thus deflected respectively towards the pixels P(1), P(2), P(3), and P(4) of macropixel M. A photon arriving above pixel P(1) or pixel P(2) will then be sorted into PS1 or PS2, and a photon arriving above pixel P(3) or pixel P(4) will be sorted into PS3 or PS4.

In the shown example, the rows of pads 117 of portion MS(1) of metasurface MS are identical to one another. Similarly, the rows of pads 117 of portion MS(2) of metasurface MS are identical to one another.

In the example shown, each microlens 401 extends over a portion MS(1) or MS(2) of metasurface MS and is adapted to focusing the incident light along orthogonal axes Ox and Oy (the horizontal axis and the vertical axis, in the orientation of FIG. 5) onto the underlying portion MS(1) or MS(2) of metasurface MS. As an example, each microlens 401 is astigmatic and, more specifically, has a focal length along the Oy axis shorter than the focal length along the Ox axis. This for example corresponds to a case where the sensor pixels P each have, in top view, a substantially square-shaped periphery. As a variant, each microlens 401 is not astigmatic. This corresponds, for example, to a case where the sensor pixels P each have, in top view, a substantially rectangular periphery, each microlens 401 having a substantially circular periphery. As an example, each microlens 401 has a focal length along the Oy axis in the order of the distance separating the microlens from the upper surface of substrate 101 (the surface of substrate 101 opposite to interconnection stack 103). Further, in this example, each portion MS(1), MS(2) of metasurface MS is adapted to mainly, or even exclusively, focusing the incident light along an axis parallel to the rows of pads 117, here the Ox axis. Thus, in this example, the focusing is jointly achieved by microlenses 401 and by metasurface MS.

This enables to simplify the design and the manufacturing of the metasurface MS of sensor 400 with respect to the metasurface MS of sensor 100. As an example, this particularly enables to provide, in sensor 400, a metasurface MS thinner than in the case of sensor 100, where the shape of the metasurface MS of sensor 400 may further be adapted to generating smaller phase jumps and phases in the vicinity of the corners of each portion MS(1) and MS(2) than in the case of the metasurface MS of sensor 100.

As a variant, the focusing may be mainly or even only achieved by microlenses 401, metasurface MS then for example having no focusing function. This enables to further simplify the design and the manufacturing of metasurface MS.

Figure 6A:
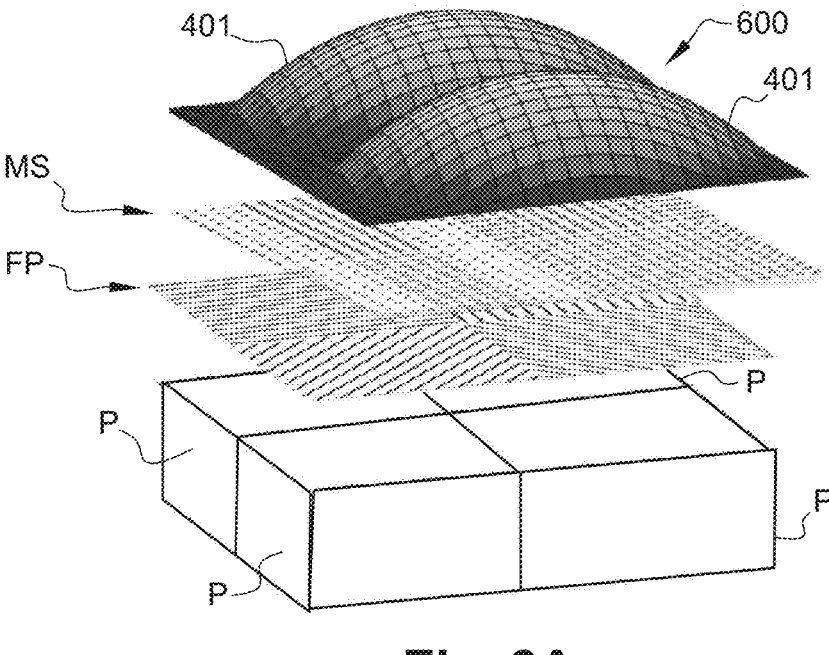
FIG. 6A and FIG. 6B respectively are an exploded perspective view and a cross-section view of another example of a polarimetric image sensor according to an embodiment.
Figure 6B:
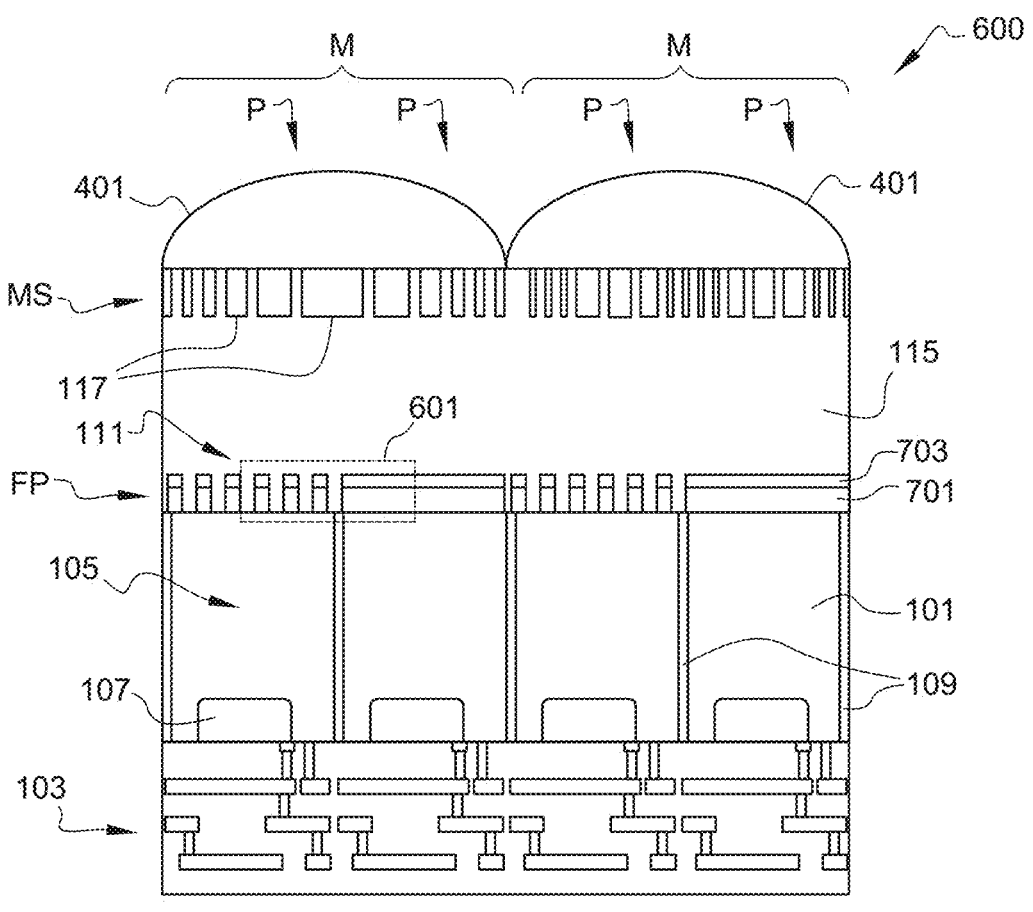

FIG. 6A and FIG. 6B are respectively an exploded perspective view and a cross-section view of another example of a polarimetric image sensor 600 according to one embodiment.

The polarimetric image sensor 600 of FIGS. 6A and 6B comprises elements in common with the polarimetric image sensor 400 of FIGS. 4A and 4B. These common elements will not be detailed again hereafter.

The sensor 600 of FIGS. 6A and 6B differs from the sensor 400 of FIGS. 4A and 4B in that sensor 600 comprises, in addition to microlenses 401 and metasurface MS, a polarizing filter FP interposed between substrate 101 and metasurface MS. The polarizing filter FP of sensor 600 is for example similar to the polarizing filter FP of sensor 100 previously described in relation with FIGS. 1A and 1B.

Figure 7:
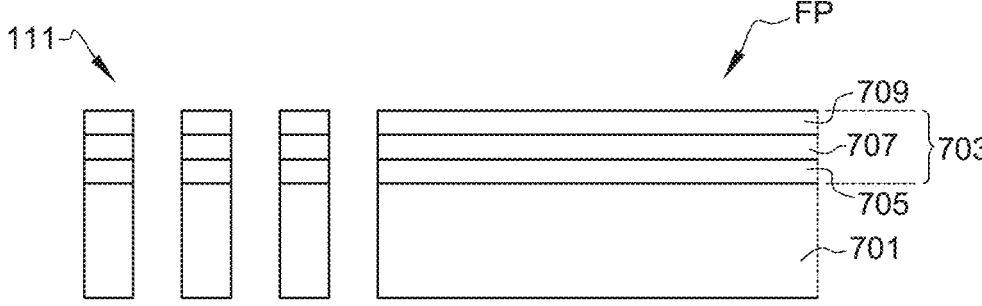
FIG. 7 is a simplified and partial cross-section view of the polarizing filter of the sensor of FIGS. 6A and 6B.

FIG. 7 is a partial and simplified cross-section view of the polarizer filter FP of the sensor 600 of FIGS. 6A and 6B. FIG. 7 is more particularly a detail view of a portion of polarizing filter FP delimited by a box in dotted lines 601 in FIG. 6B.

According to an embodiment, filter FP comprises, for each pixel P, a polarizing structure 111 comprising a plurality of parallel metal bars 701, each bar being coated with an antireflection or absorbing stack 703 comprising, in the order from the upper surface of bars 701:

a tungsten layer 705;
    a silicon layer 707, for example made of amorphous silicon, coating tungsten layer 705; and
    a dielectric layer 709, coating silicon layer 707.

As an example, metal bars 701 are made of tungsten or of aluminum.

Layer 709 is, for example, a silicon oxide layer or a silicon nitride layer. As a variant, layer 709 may be formed of a stack of a plurality of layers of dielectric materials having refraction indices lower than that of silicon, for example one or a plurality of silicon oxide layers and one or a plurality of silicon nitride layers.

The thicknesses of the layers 705, 707, and 709 of stack 703 are selected so that stack 703 has, for a central wavelength 20 of photodetector 107, an absorption coefficient higher than that of material 115. Stack 703 is sized so that, for the central wavelength 20 of photodetector 107 and for an incident radiation substantially orthogonal to the mean plane of stack 703, more than 50%, preferably more than 80%, more preferably still more than 95%, of a radiation entering stack 703 is absorbed in stack 703 in a single passage. In other words, more than 50%, preferably more than 80%, more preferably still more than 95%, of the radiation entering through the upper surface of stack 703 is absorbed in stack 703 and is not reflected towards the region made of material 115. For example, for central wavelength 20, approximately 90% of the radiation entering the stack 703 is absorbed in stack 703 in a single passage. For example, more than 50%, preferably more than 80%, more preferably still more than 90% of any radiation in the wavelength range between 920 nm and 960 nm is absorbed in a single passage in stack 703. Preferably, more than 50%, preferably more than 80%, more preferably still more than 90%, of any radiation in the passband of filter FP is absorbed in a single passage through stack 703.

To maximize the absorption in stack 703, the thickness of tungsten layer 705 is preferably relatively high, for example greater than 40 nm and preferably greater than 60 nm in a case where metal bars 701 are made of a material other than tungsten. As a variant, in the case where metal bars 701 are made of tungsten, bars 701 and layer 705 have, for example, a cumulated thickness greater than 40 nm and preferably greater than 60 nm.

Digital simulations enable to adjust the silicon thickness to be provided to maximize the absorption according to the various parameters of stack 703 and/or to central wavelength 20. As an example, the thickness of silicon layer 705 is in the range from 20 to 100 nm, preferably from 30 to 50 nm, for example equal to approximately 39 nm.

In the polarizing filter FP of sensor 600, the presence of absorbing structure 703 advantageously enables to decrease the detection of parasitic radiations in near-infrared, and thus to improve the image quality.

Figures 8, 9:
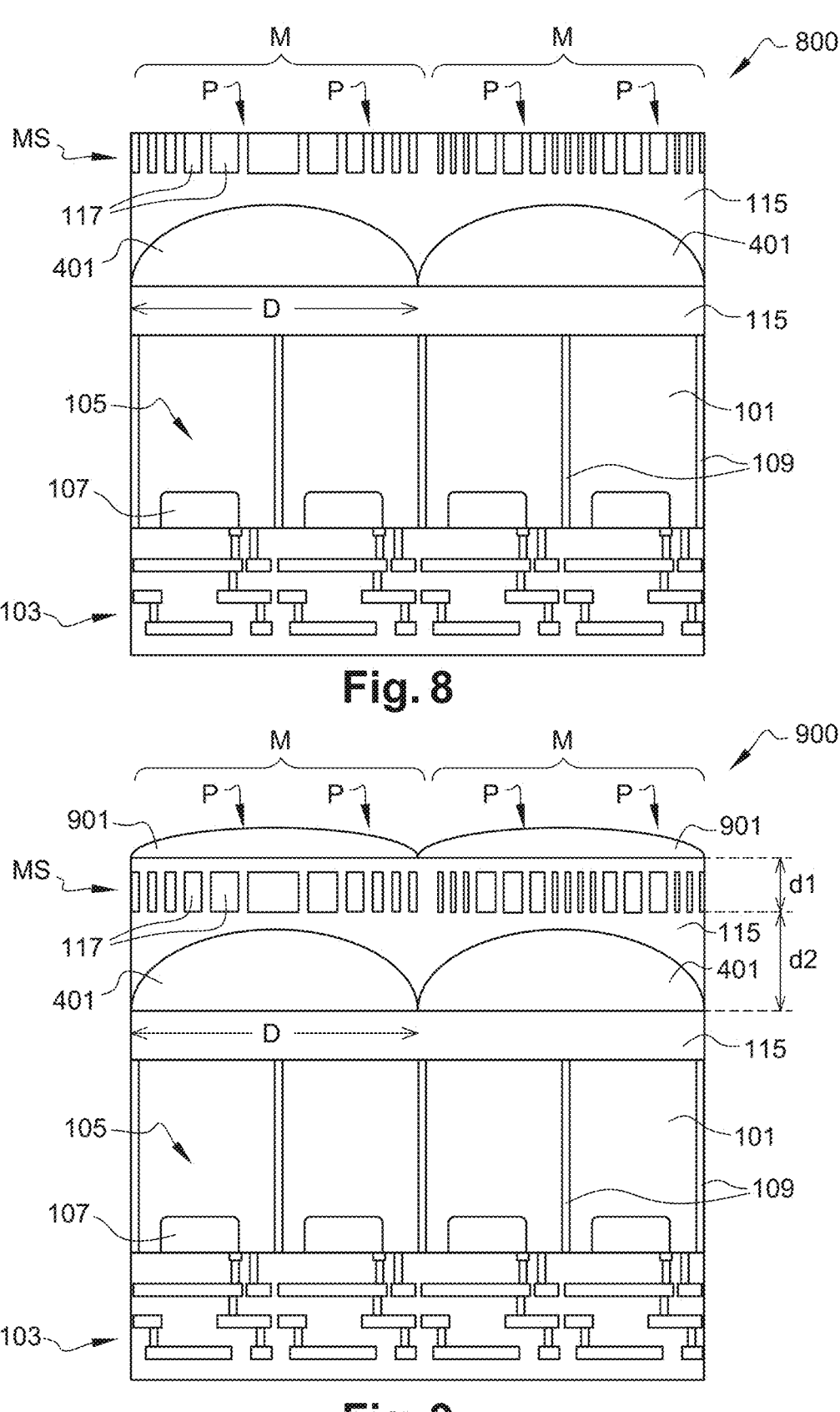
FIG. 8 is a cross-section view of another example of a polarimetric image sensor according to an embodiment.
FIG. 9 shows a cross-section view of another example of a polarimetric image sensor according to an embodiment.

FIG. 8 is a cross-section view of another example of a polarimetric image sensor 800 according to an embodiment.

The polarimetric image sensor 800 of FIG. 8 has elements in common with the polarimetric image sensor 400 of FIGS. 4A and 4B. These common elements will not be detailed again hereafter.

The sensor 800 of FIG. 8 differs from the sensor 400 of FIGS. 4A and 4B in that, in sensor 800, microlenses 401 are interposed between the photodetectors 107 of pixels P and the two-dimensional metasurface MS of the polarization router.

In this example, microlenses 401 are located in planarization layer 115. Microlenses 401 are made of a material having a higher optical index than the material of planarization layer 115. If planarization layer 115 is made of silicon oxide, microlenses 401 are formed, for example by shape transfer, in a silicon nitride or amorphous silicon layer.

The fact of providing interposing microlenses 401 between metasurface MS and photodetectors 107, for example, enables the incident radiation to be distributed within a cone defined by a lens (not shown) placed in front of sensor 100, more precisely defined by an aperture f/Dp of this lens, where f represents the focal length and Dp the diameter of the entrance pupil of the lens. An advantage linked to the fact of inserting microlenses 401 under metasurface MS is that the angles of incidence linked to the incident radiation distribution cone are smaller than those that would be produced, under similar conditions, if microlenses 401 were arranged above metasurface MS. This advantageously enables to facilitate the design and the manufacturing of metasurface MS, metasurface MS being designed and optimized to be used under a given angle of incidence, for example under a normal incidence, and having an angular acceptance lower than that of a "conventional" refractive optical element such as a lens.

The fact of placing microlenses 401 between metasurface MS and photodetectors 107 is however likely to cause undesirable crosstalk phenomena, that is, part of the incident radiation vertically in line with a given macropixel M may reach at least one of the macropixels adjacent to the considered macropixel. This is particularly the case when metasurface MS has little or no focusing power (that is, a very large or even infinite focal length), the incident radiation then mostly, or only, being deflected by metasurface MS according to their polarization. The crosstalk phenomenon is all the more present as the deflection caused by metasurface MS is significant and as the distance separating metasurface MS from microlenses 401 is large.

To overcome this disadvantage, metasurface MS is for example designed and manufactured to have a focusing function such that the radiation deflected according to their polarization, for example the radiation deflected by the first portion MS(1) of metasurface MS according to PS1 and PS2 for the pixels P(1) and P(2) of a macropixel M, only reach the underlying microlens 401. Each portion MS(1), MS(2) of metasurface MS has, for example, a focal length f1 greater than the focal length f2 of the underlying microlens 401.

As an example, the focal length f1 of each portion MS(1), MS(2) of metasurface MS is given by the following formula:

$$f1 \le \frac{D \times \tan\theta}{2} \qquad \text{[Math 1]}$$

In the above equation [Math 1], θ represents the angle of deflection of a polarization by the metasurface (polarization PS1 or PS2, for portion MS(1) of metasurface MS, or polarization PS3 or PS4, for portion MS(2) of metasurface MS), and D represents the maximum lateral dimension of the underlying microlens 401 (for example, the major axis of microlens 401, in the case where microlens 401 has an ellipsoidal cross-section).

Deflection angle θ corresponds, for example, to an angle of deflection, by metasurface MS, of a radiation arriving, under a normal incidence, at the center of portion MS(1), respectively MS(2), of metasurface MS according to the polarization PS1 or PS2, respectively PS3 or PS4, of the incident radiation.

Another solution enabling to avoid or to attenuate the crosstalk phenomenon is discussed hereafter in relation with FIG. 9.

FIG. 9 is a cross-section view of another example of a polarimetric image sensor 900.

The polarimetric image sensor 900 of FIG. 9 shares common elements with the polarimetric image sensor 800 of FIG. 8. These common elements will not be detailed again hereafter.

The sensor 900 in FIG. 9 differs from the sensor 800 of FIG. 8 in that sensor 900 further comprises, on the side of the polarization router opposite photodetectors 107, a plurality of microlenses 901 distinct from microlenses 401. Microlenses 901 are, for example, similar to microlenses 401. In the shown example, each microlens 901 has an elongated shape and extends in front of a pair of adjacent pixels P of sensor 900, for example pixels P(1) and P(2) or pixels P(3) and P(4) of one of macropixels M. Each microlens 901 has, for example, in top view, a cross-section of oval or rectangular shape with rounded corners. This example is however not limiting, and microlenses 401 may, as a variant, have any shape, for example circular or square with rounded corners, as previously discussed. In the shown example, microlenses 901 are refractive microlenses.

As an example, each microlens 901 is made of flowed resin.

In the example shown, microlenses 901 have a focal length f3 greater than the focal length f2 of microlenses 401.

As an example, the focal length f3 of each microlens 901 is given by the following equation:

$$f3 \leq \frac{D \times d1}{2\tan\theta \times d2} \qquad \text{[Math 2]}$$

In the above equation [Math 2]:
θ represents the angle of deflection of a polarization by the metasurface (polarization PS1 or PS2, for portion MS(1) of metasurface MS, or polarization PS3 or PS4, for portion MS(2) of metasurface MS);
D represents the maximum lateral dimension of the underlying microlens 401 (for example, the major axis of microlens 401, in the case where microlens 401 has an ellipsoidal cross-section);
d1 represents the distance between the lower surface of microlens 901 and the lower surface of metasurface MS, in the orientation of FIG. 9; and
d2 represents the distance between the lower surface of metasurface MS and the lower surface of microlens 401, in the orientation of FIG. 9.

Various embodiments and variants have been described. Those skilled in the art will understand that certain features of these various embodiments and variants may be combined, and other variants will occur to those skilled in the art. Based the indications of the present description, those skilled in the art are in particular capable of providing, in sensors 100 and 400, a polarizing filter having a structure similar to the polarizing filter of sensor 600, that is, comprising a plurality of parallel metal bars coated with an absorbing stack.

Further, although this has not been shown, the sensors 800 and 900 previously discussed in relation with FIGS. 8 and 9 may comprise a polarizing filter interposed between photodetectors 107 and microlenses 401, for example a polarizing filter identical or similar to the polarizing filter FP of sensor 600 or the polarizing filter FP of sensor 100.

Further, the described embodiments are not limited to the examples of dimensions and materials mentioned in the present disclosure for the forming of the metasurfaces.

Although examples of back-side illuminated (BSI) sensors have been described hereabove, the described embodiments may be adapted to front-side illuminated (FSI) sensors. In this case, the photosensitive region of each pixel is illuminated through interconnection stack 103. The polarizing filter and/or the polarization router are then formed on the front side (lower surface in the orientation of FIG. 1B) of the substrate, before the forming of interconnection stack 103.

Further, in the case of a front-side illuminated sensor, polarizing structures 111 may be formed in one or a plurality of metal levels of interconnection stack 103. This enables not to introduce an additional step for the manufacturing of polarizing structures 111.

Moreover, the described embodiments are not limited to the examples disclosed hereabove of embodiment of polarizing structures 111 formed of opaque metal patterns laterally surrounded with a transparent dielectric material. As a variant, polarizing structures 111 may be based on transparent or semi-transparent materials with contrasting indices, to improve the polarizer transmission. For example, for polarizing structures intended to operate in near infrared, for example at a wavelength in the order of 940 nm, silicon patterns, for example made of amorphous silicon, surrounded with a dielectric material of lower refraction index, for example silicon oxide, may be used. For pixels intended to measure visible radiation, silicon nitride or titanium oxide patterns, surrounded with a dielectric material with a lower refraction index, such as silicon oxide, may be used.

It should further be noted that, in a back-side illuminated sensor of the type described in relation with FIGS. 1A and 1B, according to the thickness of substrate 101 and to the wavelength intended to be measured by the pixels, part of the incident light radiation may travel across the entire thickness of the substrate and reflect on metal tracks of interconnection stack 103, before being absorbed in the photosensitive region 105 of the pixels.

The reflection on the metal tracks of the interconnection stack may result in at least partially polarizing the light in a direction depending on the orientation of said metal tracks. Preferably, for each pixel P of the sensor, the metal tracks of the interconnection stack 103 facing the pixel are oriented in a direction selected according to the polarization of the pixel, for example to favor the polarization of the reflected light according to the polarization orientation intended to be measured by the pixel. Thus, preferably, the metal tracks of interconnection stack 103 located in front of pixels intended to measure different polarizations have different orientations.

Further, the described embodiments are not limited to the above-described examples of application to visible sensors. Other wavelength ranges can benefit from polarizing pixels. For example, the described embodiments may be adapted to infrared sensors intended to measure radiations having wavelengths in the range from 1 to 2 μm, for example based on InGaAs or on germanium.

Further, although examples have been described hereabove where polarizations PS1 and PS2 are orthogonal and polarizations PS3 and PS4, rotated by 45° with respect respectively to polarizations PS1 and PS2, are orthogonal, those skilled in the art are capable of adapting the embodiments of the present disclosure to cases where polarizations PS1 and PS2 are not orthogonal and/or polarizations PS3 and PS4 are not orthogonal, polarizations PS3 and PS4 being further capable of being rotated by an angle different from 45° relative to polarizations PS1 and PS2.

Finally, the practical implementation of the described embodiments and variants is within the abilities of those skilled in the art based on the functional indications given hereabove. In particular, those skilled in the art will be capable, based on the indications of the present disclosure, of designing, sizing, and manufacturing the metasurfaces and polarizing filters and/or microlenses of the sensor pixels, so that these structures cooperate to obtain the desired effect of improvement of the compromise between the sensitivity and the polarization extinction coefficient of the pixels.

The invention claimed is:

1. Polarimetric image sensor formed inside and on top of a semiconductor substrate, the sensor comprising:

a plurality of pixels, each comprising a photodetector formed in the semiconductor substrate;

a polarizing filter arranged on the side of an illumination surface of the photodetectors, the filter comprising, for each pixel, a polarizing structure; and a polarization router comprising a two-dimensional metasurface arranged on the side of the polarizing filter opposite to the photodetectors, the metasurface comprising a two-dimensional array of pads, wherein said plurality of pixels comprises at least first and second pixels adapted to measuring radiations according to respectively first and second distinct polarizations, the polarizing structure of the first pixel being adapted to predominantly transmitting a radiation according to the first polarization and the polarizing structure of the second pixel being adapted to predominantly transmitting a radiation according to the second polarization, and wherein a first portion of the two-dimensional metasurface located vertically in line with the first and second pixels is adapted to predominantly transmitting:

a radiation according to the first polarization towards the polarizing structure of the first pixel; and a radiation according to the second polarization towards the polarizing structure of the second pixel.

2. Sensor according to claim 1, wherein the first and second polarizations are linear polarizations along first and second directions respectively forming 0° and 90° angles with a reference direction.

3. Sensor according to claim 1, wherein said plurality of pixels further comprises third and fourth pixels adapted to measuring radiations according to respectively third and fourth distinct polarizations, different from the first and second polarizations, the polarizing structure of the third pixel being adapted to predominantly transmitting a radiation according to the third polarization and the polarizing structure of the fourth pixel being adapted to predominantly transmitting a radiation according to the fourth polarization.

4. Sensor according to claim 3, wherein a second portion of the two-dimensional metasurface, different from the first portion and located vertically in line with the third and fourth pixels, is adapted to predominantly transmitting:

a radiation according to the third polarization towards the polarizing structure of the third pixel; and a radiation according to the fourth polarization towards the polarizing structure of the fourth pixel.

5. Sensor according to claim 3, wherein the third and fourth polarizations are linear polarizations along third and fourth directions respectively forming 45° and 135° angles with respect to the reference direction.

6. Sensor according to claim 1, wherein each polarizing structure comprises a plurality of parallel metal bars.

7. Sensor according to claim 6, wherein each metal bar is coated with an absorbing stack.

8. Sensor according to claim 7, wherein the absorbing stack comprises:

a tungsten layer;

a silicon layer, coating the tungsten layer; and a dielectric layer, coating the silicon layer.

9. Sensor according to claim 1, wherein the pads of the two-dimensional metasurface are made of amorphous silicon.

10. Sensor according to claim 1, wherein the pads of the two-dimensional metasurface are laterally surrounded with silicon oxide.

11. Sensor according to claim 1, wherein the pads of the two-dimensional metasurface have sub-wavelength lateral dimensions.

12. Sensor according to claim 1, further comprising a plurality of first microlenses extending in front of a pair of adjacent pixels, of the sensor.

13. Sensor according to claim 12, wherein the first microlenses each have an elongated shape.

14. Sensor according to claim 12, wherein the first microlenses are:

A) arranged on the side of a surface of the two-dimensional metasurface opposite to the photodetectors; or B) interposed between the photodetectors and the two-dimensional metasurface.

15. Sensor according to claim 14, in its option B), further comprising a plurality of second microlenses distinct from the first microlenses and arranged on the side of a surface of the two-dimensional metasurface opposite to the photodetectors, each second microlens extending in front of a pair of adjacent pixels of the sensor.

16. Sensor according to claim 15, wherein each second microlens has an elongated shape.

17. Sensor according to claim 4, further comprising a plurality of first microlenses extending in front of a pair of adjacent pixels, of the sensor, wherein each first microlens further extends in front of the first portion or of the second portion of the metasurface.

\* \* \* \* \*